US00RE39541E

(19) United States
(12) Reissued Patent
Hong

(10) Patent Number: US RE39,541 E
(45) Date of Reissued Patent: Apr. 3, 2007

(54) METHODS AND APPARATUSES FOR RECOVERING COMPRESSED MOTION PICTURE

(75) Inventor: Min-Cheol Hong, Seoul (KR)

(73) Assignee: LG. Electronics Inc.,, Seoul (KR)

(21) Appl. No.: 11/081,073

(22) Filed: Mar. 16, 2005

Related U.S. Patent Documents

Reissue of:
(64) Patent No.: 6,535,643
Issued: Mar. 18, 2003
Appl. No.: 09/430,747
Filed: Oct. 29, 1999

(30) Foreign Application Priority Data

Nov. 3, 1998 (KR) ..... 98-46895
Jul. 13, 1999 (KR) ..... 99-28137

(51) Int. Cl.
*G06T 9/00* (2006.01)
*H04N 7/26* (2006.01)
*G06K 9/36* (2006.01)
*G06K 9/40* (2006.01)

(52) U.S. Cl. ..... 382/232; 382/233; 382/254; 382/266

(58) Field of Classification Search ..... 382/232–236, 382/238–239, 173, 199, 260, 261, 263, 264, 382/254, 266, 269, 275; 358/434; 375/240.15, 375/240.16, 240.27, 240.29
See application file for complete search history.

(56) References Cited

U.S. PATENT DOCUMENTS 5,283,646 A 2/1994 Bruder
5,488,570 A 1/1996 Agarwal
5,563,813 A * 10/1996 Chen et al. ..... 708/201

(Continued)

FOREIGN PATENT DOCUMENTS

WO WO 9904497 A2 1/1999

OTHER PUBLICATIONS

"Iterative Projection Algorithms For Removing The Blocking Artifacts Of Bock–DCT Compressed Images", Yang et al., IEEE 1993, pp. V405–V408.*

(Continued)

*Primary Examiner*—Duy M. Dang
(74) *Attorney, Agent, or Firm*—Harness, Dickey, & Pierce, P.L.C.

(57) ABSTRACT

[The present invention relates to a method for recovering a compressed image for an image processing technique and an apparatus therefor. In the present invention, a cost function is defined in consideration with a directional characteristic of the pixels which will be recovered and a plurality of pixels of the recovering pixels. In addition, a regularization parameter variable having a certain weight is obtained from the cost function, and the regularization parameter variable is approximated using the compressed pixel for thereby obtaining a recovering pixel. The regularization parameter variable has a weight of a reliability with respect to the original image and a weight of a smoothing degree of the original image.] *In the methods and apparatuses for recovering a compressed motion picture a cost function is defined in consideration with a directional characteristic of the pixels which will be recovered and a plurality of pixels of the recovering pixels. In addition, a regularization parameter variable having a certain weight is obtained from the cost function, and the regularization parameter variable is approximated using the compressed pixel for thereby obtaining a recovering pixel. In the methods and apparatuses for filtering, a filtering method is selected from filtering methods having different filtering strengths based on whether a pixel being filleted is in an intra-coded portion of an image.*

26 Claims, 4 Drawing Sheets

U.S. PATENT DOCUMENTS

| | | | | | |
|---|---|---|---|---|---|
| 5,611,000 | A | * | 3/1997 | Szeliski et al. | 382/294 |
| 5,748,795 | A | | 5/1998 | Ohnishi et al. | |
| 5,790,131 | A | * | 8/1998 | Liang et al. | 345/660 |
| 5,878,166 | A | * | 3/1999 | Legall | 382/232 |
| 5,940,536 | A | | 8/1999 | Wake et al. | |
| 6,041,145 | A | | 3/2000 | Hayashi et al. | |
| 6,058,210 | A | * | 5/2000 | de Queiroz et al. | 382/232 |
| 6,108,455 | A | | 8/2000 | Mancuso | |
| 6,178,205 | B1 | | 1/2001 | Cheung et al. | |
| 6,195,632 | B1 | * | 2/2001 | Pearson | 704/206 |
| 6,226,050 | B1 | | 5/2001 | Lee | |
| 6,259,823 | B1 | | 7/2001 | Lee et al. | |
| 6,385,245 | B1 | * | 5/2002 | De Haan et al. | 375/240.16 |
| 6,529,638 | B1 | | 3/2003 | Westerman | |
| 6,594,400 | B1 | | 7/2003 | Kim | |
| 6,631,162 | B1 | | 10/2003 | Lee | |
| 6,665,346 | B1 | | 12/2003 | Lee et al. | |
| 2005/0147319 | A1 | | 7/2005 | Deshpande et al. | |
| 2005/0201633 | A1 | | 9/2005 | Moon et al. | |

OTHER PUBLICATIONS

"Iterative Procedures for Reduction of Blocking Effects in Transform Image Coding", Zakhor, IEEE Transactions on Circuits and Systems for Video Technology, vol. 2, No. 1, IEEE Mar. 1993, pp. 91–95.*

Pang, Khee K. et al. "Optimum Loop Filter in Hybrid Coolers." IEEE Circuit and Systems For Video Technology, vol. 4, No. 2, Apr. 1994, pp. 158–167.

Korean Office Action dated Jul. 18, 2005, with English Translation.

* cited by examiner

METHODS AND APPARATUSES FOR RECOVERING COMPRESSED MOTION PICTURE

Matter enclosed in heavy brackets [ ] appears in the original patent but forms no part of this reissue specification; matter printed in italics indicates the additions made by reissue.

*DIVISIONAL REISSUE APPLICATIONS*

*Notice: More than one reissue application has been filed for the reissue of U.S. Pat. No. 6,535,643. The reissue applications are applications Ser. Nos. 11/081,073 (the subject application), 11/081,075 and 11/338,905, all of which are divisional reissues of U.S. Pat. No. 6,535,643.*

BACKGROUND OF THE INVENTION

1. Field of the Invention

The present invention relates to an image processing technique, and in particular to a method for recovering a compressed video signal and an apparatus therefor.

2. Description of the Prior Art

The image compression technique of MPEG, MPEG2, H261, H263, etc. is implemented by a Hybrid MC DCT (Motion Compensation Discrete Cosine Transform) technique. This hybrid MC DCT is classified into an encoding process and decoding processes. In the encoding process, the original image is divided into a plurality of blocks for compressing the information of a spacious region, and a two-dimensional DCT is performed with respect to each block, and a redundancy is decreased in the image of between the images using a correlation on a time axis between the images for decreasing the information of the time region. In addition, in the decoding process, the reverse sequence of the decoding process is performed. In order to implement the MCDCT technique, an encoder and decoder are required.

FIG. 1 is a block diagram illustrating a conventional image encoder. As shown therein, an input video signal is subtracted by a subtractor 1 with a motion compensated video signal from a video memory 9 and is inputted via a first switching unit 2 and a DCT unit 3. The DCT unit 3 processes the inputted video signal based on a DCT, and a quantization unit 4 quantizes a DCT-processed video signal and outputs a DCT coefficient q. This coefficient is reversely quantizated by a reverse quantizing unit 6 and is processed based on a reverse DCT by a reverse DCT unit 7 for thereby recovering the original video signal. The thusly recovered video signal is summed by a summing unit 8 with a video signal recovered in the earlier process via a second switching unit 10 and is inputted into the video memory. A controller 5 controls the first and second switching units 2 and 10 and transmits an intra/inter information (p=mtype; flag for INTRA/INTER), a transmission information (q; flag for transmitted or not), and an quantizing information (qz=Qp; quantizer indication) to a decoder (not shown in FIG. 1). The video memory 9 outputs a motion vector information (v=MV; motion vector) to the decoder. The DCT unit 3 outputs a DCT coefficient q to the decoder.

While the video signal is being coded, the information may be lost during the quantizing process. Therefore, the video signals reconstructed by the decoder may cause blocking artifacts and ring effects. The block artifacts occur when quantizing a low frequency DCT coefficient, and the ring effects occur due to the information loss of the original video in the quantizing process for a high frequency DCT coefficient.

Namely, in the case of the coding technique using a DCT in a system which is capable of coding a still picture or a motion picture, the entire image is divided into a plurality of small images (for example, 8×8 blocks), and then a transforming operation is performed with respect to the divided blocks, and the original image is processed based on a DCT, and an important information of the original image based on a result of the conversion is included in the low frequency component. As the component becomes high frequency, the important information is decreased. The low frequency component includes an information related to the neighboring block. The DCT transform is performed without considering a correlation between the blocks. Namely, the low frequency components are quantized by the blocks, so that a continuity between the neighboring blocks is lost. This phenomenon is [called as the] *referred to as* blocking artifacts.

In addition, when quantizing the coefficients obtained [when performing] *from* the DCT operation, as the interval of the quantizing operation is increased, the components to be coded is decreased. Therefore, the number of bits which will be processed is decreased, so that [a] distortion occurs in the reconstructed original image. This phenomenon is [called as the] *referred to as* ring effects. The ring effects, which occur when increasing the intervals of the quantizing operations, are increased at a contour line of an object [among] *in* the images.

As a technique for removing the above-described block artifacts and ring effects, a low pass filter technique and a regularization recovering technique are generally used.

The low pass filter sets a filter tap or a filter coefficient based on or by selecting (filter mask) a plurality of pixels near a certain pixel and obtaining an average of the pixels. The recovered images are over smoothed in accordance with the kinds of images, and a compression ratio.

In the regularization recovering method, the block artifacts are adaptively processed in accordance with the statistical characteristic of the images. Namely, [a] non-uniform information is [all] computed at all direction boundary areas and in the interior of the block. However, since the computed values have a matrix form, it is impossible to implement a real time computation due to [a] *the* large amount of computation. In addition, [with an exception] *except* for the amount of non-uniformity, since an average is comprehensively adapted based on a result of the computation of the non-uniform information, in the block having a large amount of non-uniformity, the degree of the non-uniformity is decreased. On the contrary, the degree of the non-uniformity may be increased. Therefore, it is hard to say *whether* it [is well adaptive] *adapted well* to the system.

The above-described two techniques have advantages and disadvantages in view of a complexity and performance increase of the system. Namely, the low pass filter technique [has] *requires* less computation [amount] compared to the regularization recovering technique [and has], *but has* a small capacity for adaptively processing the images, so that the information is lost at an edge portion. The regularization recovering method has [an] excellent performance [and], *but* requires a large amount of computation when computing regularization parameters.

SUMMARY OF THE INVENTION

[Accordingly, in the present invention, it is possible to removing a block artifact and ring effect which occur in a decoded video signal.

In addition, it is possible to define a cost function having a directional feature by the unit of pixels during a decoding operation and obtain a regularization parameter based on the cost function.

To achieve the above objects, there is provided a method for recovering a compressed motion picture according to an embodiment of the invention, comprising the steps of defining a cost function having a smoothing degree of an image and a reliability with respect to an original image in consideration of the directional characteristics of the pixels which will be recovered and a plurality of pixels near the recovering pixels, obtaining a regularization parameter variable having a weight value of a reliability with respect to an original image based on the cost function, and approximating the regularization parameter variable using the compressed pixel and obtaining a recovering pixel.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.]

*Accordingly, in the present invention, it is possible to remove a block artifact and ring effect which occur in a decoded video signal.*

*In addition, in at least one embodiment, it is possible to define a cost function having a directional feature by the unit of pixels during a decoding operation and obtain a regularization parameter based on the cost function.*

*One embodiment provides a method for recovering a compressed motion picture, comprising the steps of defining a cost function having a smoothing degree of an image and a reliability with respect to an original image in consideration of the directional characteristics of the pixels which will be recovered and a plurality of pixels near the recovering pixels, obtaining a regularization parameter variable having a weight value of a reliability with respect to an original image based on the cost function, and approximating the regularization parameter variable using the compressed pixel and obtaining a recovering pixel.*

*At least one embodiment of the present invention also provides a method of filtering an image. In one embodiment, a filtering method is selected from filtering methods having different filtering strengths based on whether a pixel being filtered is in an intra-coded portion of an image. For example, a filtering method may be selected based on whether the pixel being filtered is in an intra-coded macro block.*

*Furthermore, in one embodiment, the selected filtering method adjusts a degree of filtering based on a difference value where the difference value is based on the pixel being filtered and a neighboring pixel. For example, the neighboring pixel may be a pixel adjacent to the pixel being filtered.*

*Additionally, in one embodiment, the selected filtering method filters the pixel based on a quantization parameter used in processing a portion of an image including the pixel.*

*In yet another embodiment, the selected filtering method includes determining at least one boundary value based on a quantization parameter of a portion of the image including the pixel.*

BRIEF DESCRIPTION OF THE DRAWINGS

The present invention will become more fully understood from the detailed description given hereinbelow and the accompanying drawings which are given by way of illustration only, and thus as not limitative of the present invention and wherein.

DETAILED DESCRIPTION OF THE [PREFERRED] *EXAMPLE* EMBODIMENTS

Figure 1:
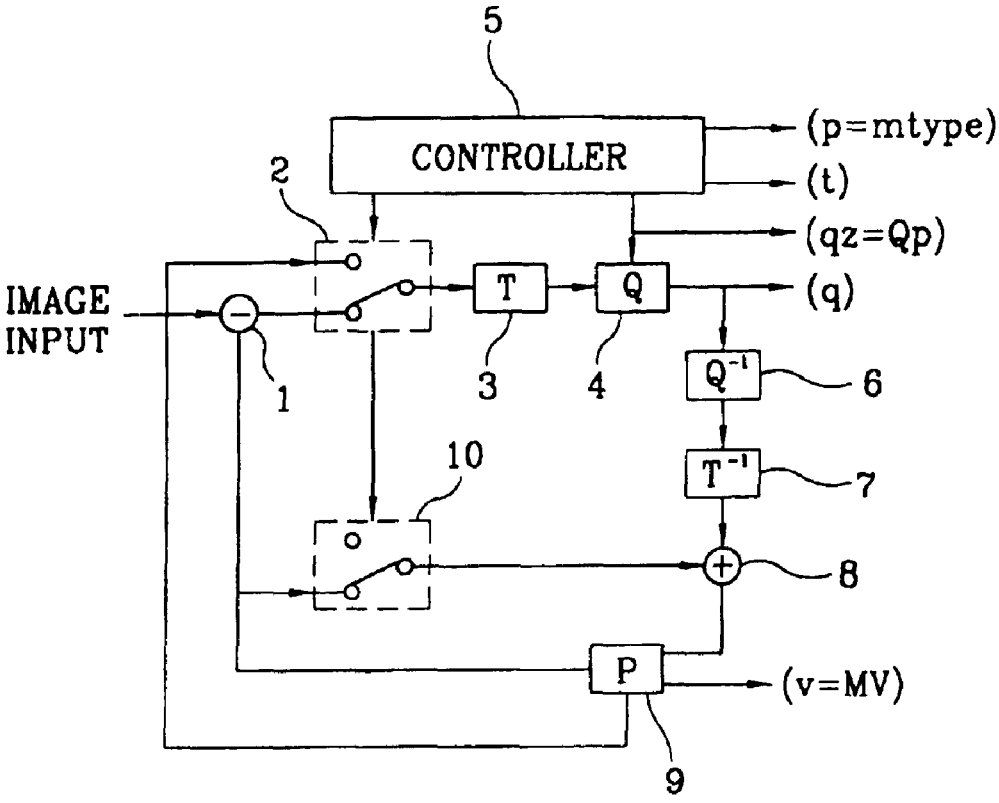
FIG. 1 CONVENTIONAL ART
FIG. 1 is a block diagram illustrating a conventional video encoder.
Figure 2:
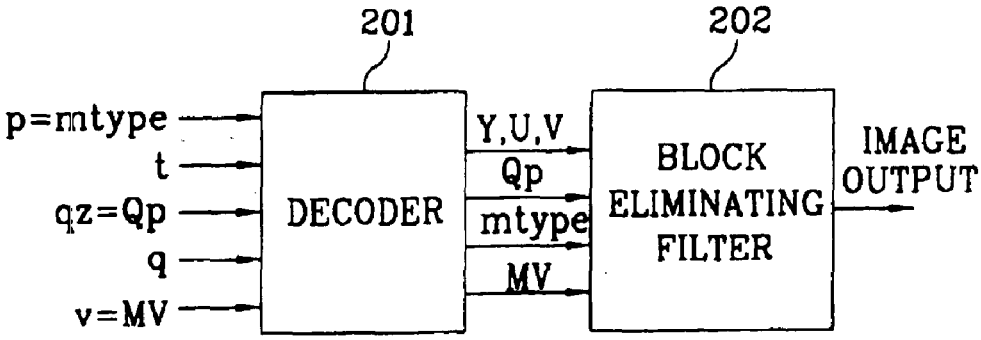
FIG. 2 is a block diagram illustrating an apparatus for recovering a compressed motion picture according to an embodiment of the present invention.

FIG. 2 is a block diagram illustrating an apparatus for recovering a compressed motion picture according to an embodiment of the present invention. As shown therein, a decoder 201 receives an intra/inter information (p=mtype), a transmission information (t), a quantizing information (qz=Qp), a DCT coefficient q, and a motion vector information (v=MV; motion vector) from an encoder as shown in FIG. 1 and decodes the thusly received information. The encoder and decoder 201 are connected by a communication channel or network. A block removing filter 202 receives a video signal (Y,U,V), a quantizing variable (qz=Qp), a macro block type (mtype), and a motion vector (v=MV) from the decoder 201 and performs an image compressing process according to the present invention for thereby outputting a recovered video signal.

Figure 3:
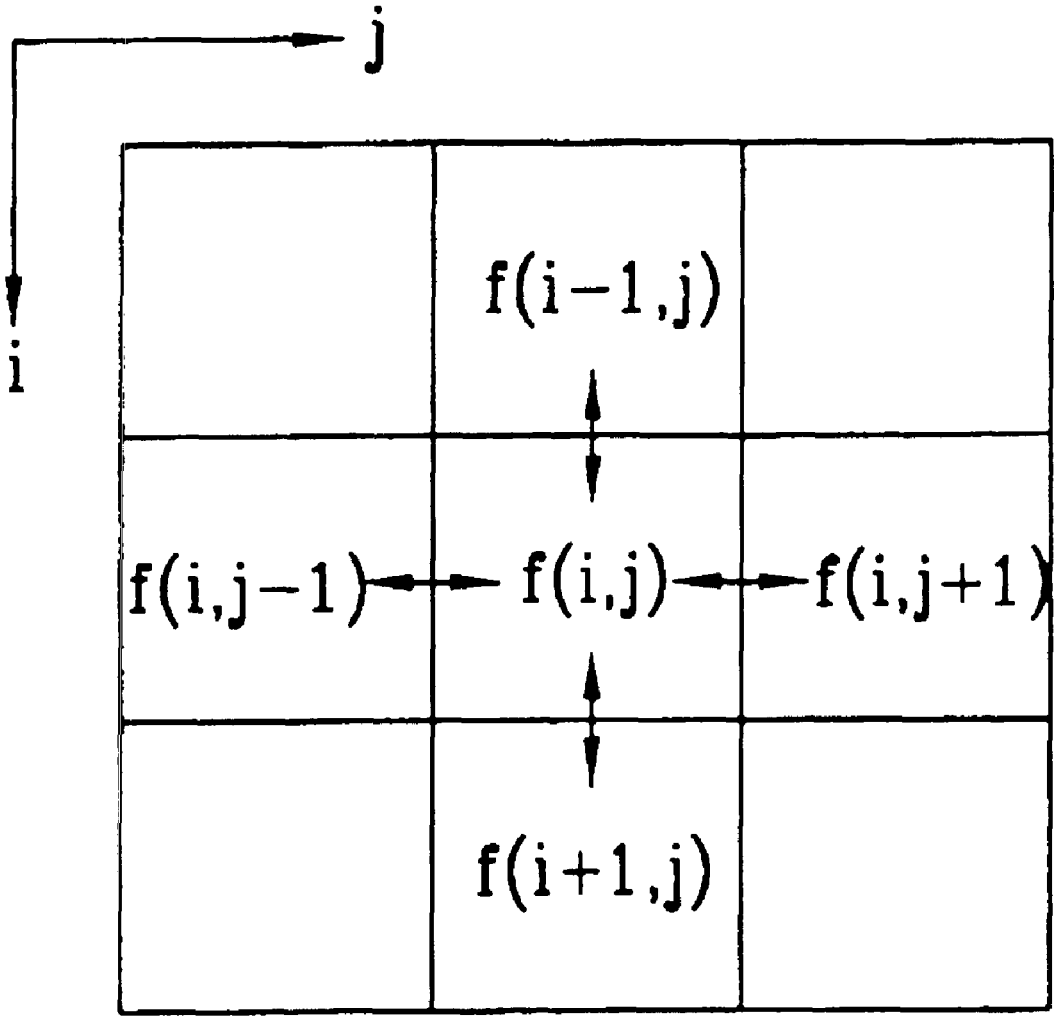
FIG. 3 is a view illustrating pixels and a position information of the pixels for explaining the operation of *an embodiment of* the present invention.

FIG. 3 illustrates pixels and the position of the pixels for explaining the operation of the present invention. As shown therein, assuming the original pixels f(i,j) at the center portion as a reference, f(i,j−1) represents a pixel near the left side, and f(i,j+1) represents a pixel near the right side, and f(i−1,j) represents a pixel near the upper side, and f(i+1,j) represents a pixel near the lower side. Here, i, j represent a position information of each pixel.

A first embodiment of the present invention will be explained with reference to the accompanying drawings.

In the first embodiment of the present invention, a cost function having a directional feature by the unit of pixels is defined, and a regularization parameter is obtained based on the cost function. A recoverable pixel is obtained using a value which is actually adapted to the regularization parameter and is processed based on a DCT and a projection. Then a resultant data is processed based on a reverse DCT for thereby recovering an image similar to the original image. The above-described operation will be explained in detail.

Definition of Cost Function

When the original image f is compressed and transmitted, the image g which is reconstructed by the decoder 201 may be expressed as follows.

$$g=f+n \tag{1}$$

where, g, f, and n have a size of MM×1 rearranged in a scanning sequence, and n represents a quantizing difference.

In order to process the original image f by the unit of pixels, the original pixels f(i,j) having a certain position information(i,j) is adapted. The recovered pixel g(i,j) may be expressed using the original pixel(i,j) and a quantizing difference n(i,j) with respect to the original pixel(i,j).

$$g(i,j)=f(i,j)+n(i,j) \tag{2}$$

As seen Equation 2, a smoothing [which] represents a non-uniformity degree with respect to the original pixel f(i,j) and the neighboring pixels of the original pixel f(i,j) and a cost function [including] *includes* a reliability with respect to the original pixel f(i,j) and the compressed pixel g(i,j).

First, in order to consider the directional features of four pixels f(i,j+1), f(i+1,j), f(i,j−1), and f(i−1,j) with respect to the original pixel f(i,j), the cost functions of $M_{HL}$ (f(i,j)), $M_{HR}$ (f(i,j)), $M_{VT}$ (f(i,j)), $M_{VD}$ (f(i,j)), $M_T$ (f(i,j)) are defined with respect to the neighboring pixels. In order to set a time based region relationship of the original pixel f(i,j), the cost function $M_T$ (f(i,j)) is defined. Next, the cost functions of $M_{HL}$ (f(i,j)), $M_{HR}$ (f(i,j)), $M_{VT}$ (f(i,j)), $M_{VD}$ (f(i,j)), $M_T$ (f(i,j)) with respect to the neighboring pixels and the cost function $M_T$(f(i,j)) of the time region are summed, so that it is possible to obtain the cost function M(f(i,j)) with respect to the original pixel f(i,j) [may be obtained based on] *as shown in* Equation (3).

$$M(f(i,j))=M_{HL}(f(i,j))+M_{HR}(f(i,j))+M_{VT}(f(i,j))+M_{VD}(f(i,j))+M_T(f(i,j)) \tag{3}$$

where $M_{HL}$ represents a cost function having a relationship between the pixel f(i,j) and the left side neighboring pixel f(i,j−1), $M_{HR}$(f(i,j)) represents a cost function having a relationship between the pixel f(i,j) and the right side neighboring pixel f(i,j+1), $M_{VT}$(f(i,j)) represents a cost function having a relationship between the pixel f(i,j) and the upper side neighboring pixel f(i−1,j), $M_{VD}$(f(i,j)) represents a cost function having a relationship between the pixel f(i,j) and the lower side neighboring pixel f(i+1,j), and $M_T$(f(i,j)) represents a cost function having a relationship of the time region.

The cost function having a smoothing degree and reliability may be expressed as the following equation 4.

$$\begin{aligned}
M_{HL}(f(i,j)) &= [f(i,j)-f(i,j-1)]^2+\alpha_{HL}[g(i,j)-f(i,j)]^2 \\
M_{HR}(f(i,j)) &= [f(i,j)-f(i,j+1)]^2+\alpha_{HR}[g(i,j)-f(i,j)]^2 \\
M_{VT}(f(i,j)) &= [f(i,j)-f(i-1,j)]^2+\alpha_{VT}[g(i,j)-f(i,j)]^2 \\
M_{VD}(f(i,j)) &= [f(i,j)-f(i+1,j)]^2+\alpha_{VD}[g(i,j)-f(i,j)]^2 \\
MT(f(i,j)) &= [f(i,j)-f_{MC}(i,j)]^2+\alpha_T[g(i,j)-f(i,j)]^2
\end{aligned} \tag{4}$$

As seen in Equation 4, the first term of the right side of each cost function represents a smoothing degree with respect to the original pixel and the neighboring pixel, and the second term of the right side represents a reliability with respect to the original pixel and the recovered pixel.

The first term of the right side of the cost function $M_{HL}$(f(i,j)) represents a square value of the difference between the original pixel f(i,j) and the left side neighboring pixel f(i,j−1) and represents a uniformity degree, namely, a smoothed degree of the original pixel f(i,j) and the left side neighboring pixel f(i,j−1) based on the error component between the original pixel f(i,j) and the left side neighboring pixel f(i,j−1). In addition, the second term of the right side of the cost function $M_{HL}$(f(i,j)) represents a square value of the difference between the original pixel f(i,j) and the compressed pixel g(i,j) and represents a value for comparing whether a certain difference exists between the compressed pixel g(i,j) and the original pixel f(i,j) based on a difference component between the original pixel f(i,j) and the compressed pixel g(i,j) and represents a reliability of the original pixel f(i,j) and the compressed pixel g(i,j).

In addition, the first term of the right side of $M_{HR}$(f(i,j)) represents a smoothing degree of the original pixel f(i,j) and the right side neighboring pixel f(i,j+1), and the second term of the right side represents a reliability of the original pixel f(i,j) and the compressed pixel g(i,j). The first term of the right side of the cost function $M_{VT}$(f(i,j)) represents a smoothing degree of the original pixel f(i,j) and the upper side neighboring pixel f(i−1,j), and the second term of the right side represents a reliability of the original pixel, and the compressed pixel g(i,j). The first term of the right side of the cost function $M_{VT}$(f(i,j)) represents a smoothing degree of the original pixel f(i,j) and the lower side neighboring pixel f(i+1,j), and the second term of the right side represents a reliability of the original pixel f(i,j) and the compressed pixel g(i,j). $M_T$(f(i,j)) represents a cost function for setting a relationship of the time region.

The values of $\alpha_{HL}$, $\alpha_{HR}$, $\alpha_{VT}$, $\alpha_{VD}$ $\alpha_T$ of the second term of the right side represents a regularization parameter and a ratio of a smoothing degree and reliability. These values represent a different component. In addition, these values represent a weight value with respect to the reliability. As these values are increased, the reliability is enhanced. Since the smoothing degree and the reliability are opposite to each other, the ratio of the smoothing degree and reliability is determined when the regularization parameter is determined. Each regularization parameter may be expressed as the following Equation 5.

$$\begin{aligned}
\alpha_{HL} &= \frac{[f(i,j)-f(i,j-1)]^2}{[g(i,j)-f(i,j)]^2}, \quad \alpha_{HR} = \frac{[f(i,j)-f(i,j+1)]^2}{[g(i,j)-f(i,j)]^2} \\
\alpha_{VT} &= \frac{[f(i,j)-f(i-1,j)]^2}{[g(i,j)-f(i,j)]^2}, \quad \alpha_{VD} = \frac{[f(i,j)-f(i+1,j)]^2}{[g(i,j)-f(i,j)]^2} \\
\alpha_T &= \frac{[f(i,j)-f_{MC}(i,j)]^2}{[g(i,j)-f(i,j)]^2}
\end{aligned} \tag{5}$$

In the above Equation 5, the denominators of the above-equations represents a difference between the original pixel and the compressed pixel, and the numerator represents a difference between the original pixel and the neighboring pixel.

Computation of Recovering Pixels Based on Cost Function

It is needed to obtain the recovering pixels which is the original pixels. However, the cost function includes a square with respect to the original pixel. Therefore, the cost function is partially differentiated with respect to the original pixel, so that it is possible to obtain the original pixels based on the differentiated values. The cost function M(f(i,j)) may be differentiated based on Equation 3.

$$\begin{aligned}
\partial M\frac{(f(i,j))}{\partial f(i,j)} &= \frac{\partial M_{HL}(f(i,j))}{\partial f(i,j)} + \frac{\partial M_{HR}(f(i,j))}{\partial f(i,j)} + \\
&\frac{\partial M_{VT}(f(i,j))}{\partial f(i,j)} + \frac{\partial M_{VD}(f(i,j))}{\partial f(i,j)} + \\
&\frac{\partial M_T(f(i,j))}{\partial f(i,j)} = 0
\end{aligned} \tag{6}$$

Each term of the right side of the cost function with respect to the neighboring pixels is as follows.

$$\frac{\partial M_{HL}(f(i,j))}{\partial f(i,j)} = 2[f(i,j)-f(i,j-1)] - 2\alpha_{HL}[g(i,j)-f(i,j)] \quad (7)$$

$$\frac{\partial M_{HR}(f(i,j))}{\partial f(i,j)} = 2[f(i,j)-f(i,j+1)] - 2\alpha_{HR}[g(i,j)-f(i,j)]$$

$$\frac{\partial M_{VT}(f(i,j))}{\partial f(i,j)} = 2[f(i,j)-f(i-1,j)] - 2\alpha_{VT}[g(i,j)-f(i,j)]$$

$$\frac{\partial M_{VD}(f(i,j))}{\partial f(i,j)} = 2[f(i,j)-f(i+1,j)] - 2\alpha_{VD}[g(i,j)-f(i,j)]$$

$$\frac{\partial M_{T}(f(i,j))}{\partial f(i,j)} = 2[f(i,j)-f_{MC}(i,j)] - 2\alpha_{T}[g(i,j)-f(i,j)]$$

The values of Equation 7 are substituted for Equation 6, and the pixels which will be finally recovered are in the following Equation 8.

$$f(i,j) = \frac{f(i,j-1)+f(i,j+1)+f(i-1,j)+f(i+1,j)+f_{MC}(i,j)+\alpha_{TOT}g(i,j)}{5+\alpha_{TOT}} \quad (8)$$

$$\alpha_{TOT} = \alpha_{HL}+\alpha_{HR}+\alpha_{VT}+\alpha_{VD}+\alpha_{T}$$

The pixels expressed by Equation 8 are the pixels included in the inter macro block. However, the pixels of the macro block coded into the intra macro type based on Equation 6 is $$\frac{\partial M_{T}(f(i,j))}{\partial f(i,j)} = 0$$

because there is not a motion information on tile time axis. Therefore, the pixels included in the intra macro block may be expressed in the following Equation 9.

$$f(i,j) = \frac{f(i,j-1)+f(i,j+1)+f(i-1,j)+f(i+1,j)+\alpha_{TOT}g(i,j)}{4+\alpha_{TOT}} \quad (9)$$

$$\alpha_{TOT} = \alpha_{HL}+\alpha_{HR}+\alpha_{VT}+\alpha_{VD}$$

Therefore, the pixels included in the inter macro block are obtained based on Equation 8, and the pixels included in the intra macro block are obtained based on Equation 9. Whether the pixels of the macro block are coded in the intra macro type or in the inter macro type are determined by the intra inter information (p=mtype).

As seen in Equation 8 and 9, the recovering pixels include a regularization parameter α, and each regularization parameter variable is approximated as follows.

Approximation of Regularization Parameter Variable

As seen in Equation 5, each regularization parameter variable includes an original pixel, a neighboring pixel, and a recovering pixel (compressed pixel). In addition, since the original pixel f(i,j) and four neighboring pixels f(i,j−1), f(i,j+1), f(i−1,j), f(i+1,j) are the original pixels, these values do not exist in the decoder. Therefore, the pixels f(i,j), f(i,j−1), f(i,j+1), f(i−1,j), f(i+1,j) may not be used for an actual computation. Therefore, in order to actually use the pixels f(i,j), f(i,j−1), f(i,j+1), f(i−1,j), f(i+1,j), the compressed pixels g(i,j), g(i,j−1), g(i,j+1), g(i−1,j), g(i+1,j) must be approximated. To implement the above-described approximation, the following three cases are assumed.

First, the quantizing maximum difference of the macro block unit is a quantizing variable (Qp).

Second, a quantizing difference of each DCT coefficient is uniformly allocated to each pixel of a corresponding macro block, Third, the non-uniform values between two pixels of the original image are statistically similar to the non-uniform values between two pixels of the compressed image.

As seen in the following Equation 10, each regularization variable is approximated based on the above-described three cases.

$$\alpha_{HL} = \frac{[f(i,j)-f(i,j-1)]^2}{[g(i,j)-f(i,j)]^2} = \frac{[g(i,j)-g(i,j-1)]^2}{Q_{pi}^2} \quad (10)$$

$$\alpha_{HR} = \frac{[f(i,j)-f(i,j+1)]^2}{[g(i,j)-f(i,j)]^2} = \frac{[g(i,j)-g(i,j+1)]^2}{Q_{pi}^2}$$

$$\alpha_{VT} = \frac{[f(i,j)-f(i-1,j)]^2}{[g(i,j)-f(i,j)]^2} = \frac{[g(i,j)-g(i-1,j)]^2}{Q_{pi}^2}$$

$$\alpha_{VD} = \frac{[f(i,j)-f(i+1,j)]^2}{[g(i,j)-f(i,j)]^2} = \frac{[g(i,j)-g(i+1,j)]^2}{Q_{pi}^2}$$

$$\alpha_{T} = \frac{[f(i,j)-f_{MC}(i,j)]^2}{[g(i,j)-f(i,j)]^2} = \frac{[g(i,j)-f_{MC}(i,j)]^2}{Q_{pi}^2}$$

where 1 represents the 1-th macro block, and Qp1 represents a quantizing variable of the 1-th macro block. As seen in Equation 10, the difference between the original pixel which is the denominator component of each regularization parameter variable and the compressed pixel is approximated based on the quantizing maximum difference, and the difference between the original pixel which is the numerator component and the compressed pixel is approximated based on the difference with respect to the difference value between the compressed pixel and the neighboring pixel.

The thusly approximated regularization parameter variable is substituted for Equation 8 or 9 for thereby obtaining a result value f(i,j).

Figure 4:
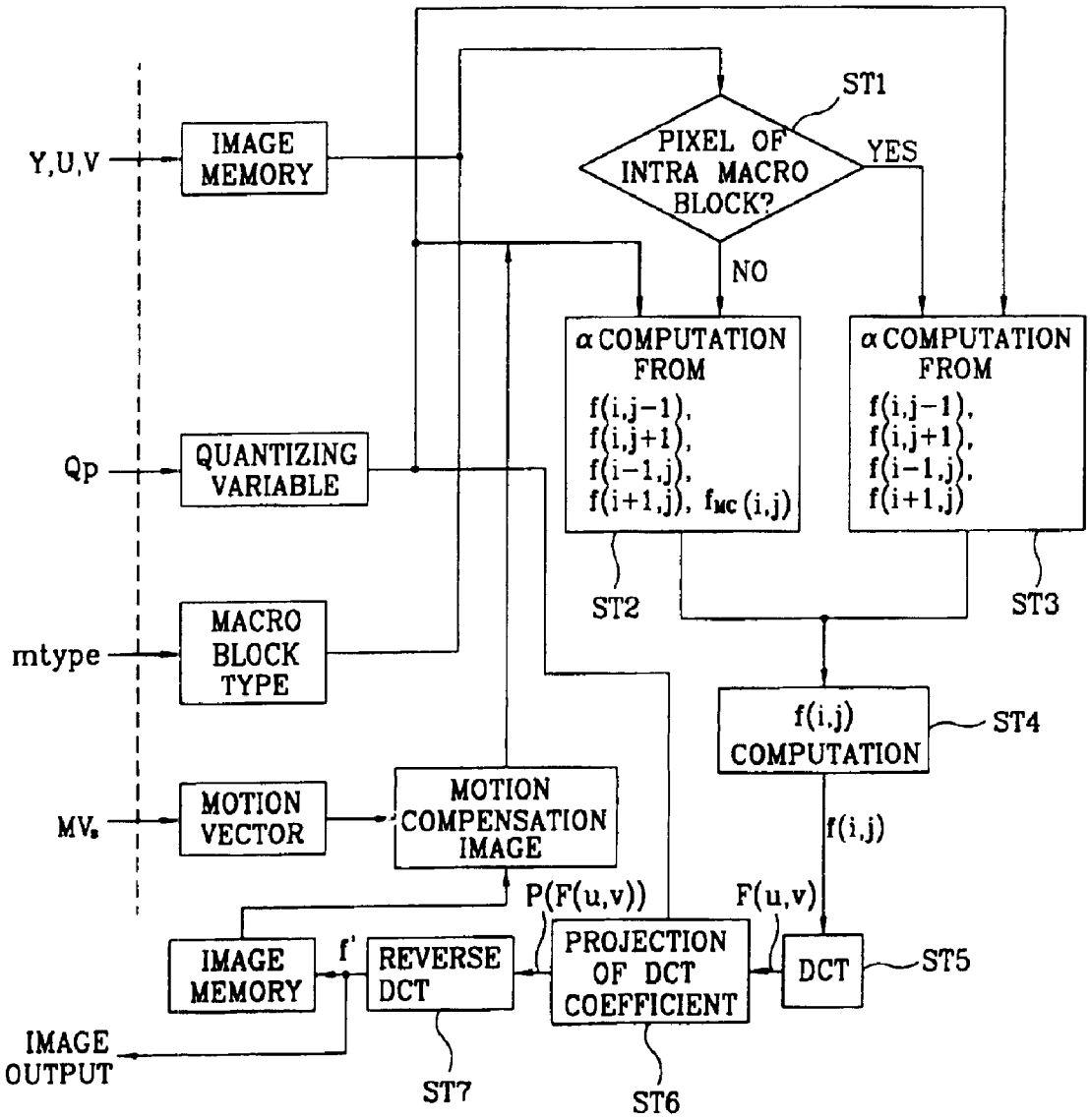
FIG. 4 is a flow chart of a method for recovering a compressed motion picture according to an embodiment of the present invention.

FIG. 4 is a flow chart illustrating a method for recovering a compressed motion picture according to the present invention.

As shown therein, in Step ST1, whether the processing pixels are referred to the pixels of the intra macro block or the pixels of the inter macro block is judged. As a result of the judgement, in Steps ST2 and ST3, the regularization parameter variable is obtained. Namely, if the processing pixels are referred to the pixels of the intra macro block, in Step ST2, the regularization parameter variables $\alpha_{HL}$, $\alpha_{HR}$, $\alpha_{VT}$, $\alpha_{VDar}$ are obtained based on Equation 9. In addition, if the processing pixels are referred to the pixels of the inter macro block, the regularization parameter variables $\alpha_{HL}$, $\alpha_{HR}$, $\alpha_{VT}$, $\alpha_{VD}$, $\alpha_{T}$ are obtained in Step ST3. In addition, the pixel f(i,j) is obtained in Step ST4 based on the obtained regularization parameter variable. At this time, if the processing pixels are referred to the pixels of the inter macro block, and the pixels are obtained based on Equation 8, and if the processing pixels are referred to the pixels of the inter macro block, the pixels are obtained based on Equation9.

Recovering the Images Using a Projection Technique

In Step ST5, a DCT is performed with respect to the pixel [f(ij)] *f(i,j)*, and then a quantizing process is performed therefor. Here, the DCT coefficient of the pixel f(i,j) may be expressed as F(u,v).

The value G(u,v) which is DCT-processed with respect to the compressed image g(i,j) may be expressed in the DCT region based on the following Equation 11.

$$G=QBf \quad (11)$$

where B represents a DCT process, and Q represents a quanitizing process.

The DCT coefficient of the original image and the DCT coefficient of the compressed image have the following interrelationship as seen in Equation 12.

$$G(u,v)-Qp1 \leqq F(u,v) \leqq G(u,v)+Qp1 \quad (12)$$

where G(u,v) represents a (u,u)-th value of the two-dimensional DCT coefficient of the compressed image, F(u,v) represents a (u,v)-th value of the two-dimensional DCT coefficient of the original image, Qp1 represents the quantizing maximum difference of the 1-th macro block, and each DCT coefficient value represents a subset for setting the range of the DCT coefficient of the recovered images. Therefore, the recovered images must be projected based on the subset of Equation 12, and this process is performed in Step ST6 as seen in the following Equation 13.

$$P(F(u,v))=G(u,v)-Qp1 \text{ if } F(u,v)<G(u,v)-Qp1$$

$$P(F(u,v))=G(u,v)+Qp1 \text{ if } F(u,v)>G(u,v)+Qp1$$

$$P(F(u,v))=F(u,v) \text{ otherwise} \quad (13)$$

The Equation 13 will be explained in detail.

If F(u,v) is smaller than G(u,v)−Qp1, the projected recovering image P(F(u,v) is mapped based on G(u,v)−Qp1, and if F(u,v) is larger than G(u,v)−Qp1, the projected recovering image P(F(u,v)) is mapped based on G(u,v)+Qp1, otherwise P(F(u,v)) is directly mapped based on the projected recovering image F(u,v).

The mapped image P(F(u,v)) is reversely DCT-processed in the spacious region in Step ST7, and the finally recovered image may be expressed by the following Equation 14.

$$f=B^TPBf=B^TPBK(g) \quad (14)$$

where K(g) represents a computation of the recovering pixels of Equation 8 or 9, BK(g) represents a block DCT coefficient, PBK(g) represents a projected block DCT coefficient, and $B^TPBK(g)$ represents that the projected block DCT coefficient is recovered in the spacious region. The recovered image is stored in the image memory and is outputted.

In the present invention, it is possible to eliminate a block artifact and ring effect based on an non-uniform degree and reliability of the recovered image using a plurality of information from the decoder.

Repetition Technique

If the block artifact and ring effect are not fully eliminated from the recovered pixels, [he] *the* above-described processes may be repeatedly performed. As the process for eliminating the block artifact and ring effect is repeatedly performed, the block artifact and ring effect of the recovering image is [more] *further* eliminated. In this case, a blurring phenomenon occurs in the edge region of the image. Therefore, the number of repetition must be determined based on the block artifact and ring effect and the blurring phenomenon which is opposite thereto.

The recovering image $f_{k+1}(i,j)$ is as follows based on Equations 15 and 16 by repeating the above-described process by k-times.

$$f_{k+1}(i,j)=\frac{f_k(i,j-1)+f_k(i,j+1)+f_k(i-1,j)+f_k(i+1,j)+f_{MC}(i,j)+\alpha_{k,TOT}g(i,j)}{5+\alpha_{k,TOT}} \quad (15)$$

$$\alpha_{k,TOT}=\alpha_{k,HL}+\alpha_{k,HR}+\alpha_{k,VT}+\alpha_{k,VD}+\alpha_{k,T}$$

$$f_{k+1}(i,j)=\frac{f_k(i,j-1)+f_k(i,j+1)+f_k(i-1,j)+f_k(i+1,j)+f_{MC}(i,j)+\alpha_{k,TOT}g(i,j)}{4+\alpha_{k,TOT}} \quad (16)$$

$$\alpha_{k,TOT}=\alpha_{k,HL}+\alpha_{k,HR}+\alpha_{k,VT}+\alpha_{k,VD}$$

The image expressed based on Equation 15 is related to the pixels included in the inter macro block, and the image expressed based on Equation 16 is related to the pixels included in the intra macro block.

The regularization parameter variables are obtained based on Equations [15)] *15* and 16, and the DCT is performed with respect thereto, and the projection technique is adapted[, and then]. *Then* the reverse DCT is performed therefor, so that the final recovering image is obtained based on Equation 17.

$$f_{k+1}'=B^TPB\hat{f}=B^TPBK(g_{k+1}) \quad (17)$$

Namely, the block artifact and ring effects are eliminated from the recovered images by an adaptive decoding operation, so that a real time process is implemented in the digital video apparatus. In particular, it is possible to enhance the resolution in the compression images which require a low bit [ration] *ratio* or high speed process.

Next, another embodiment of the present invention will be explained.

This embodiment of the present invention is basically directed to decreasing the computation amount and time compared to the earlier embodiment of the present invention. The operation thereof is performed by the recovering apparatus, as shown in FIG. 2, of the compression motion picture according to the present invention. First, the cost function may be defined as seen in Equation 18.

$$M(f(i,j))=M_L(f(i,j))+M_R(f(i,j))+M_U(f(i,j))+M_D(f(i,j)) \quad (18)$$

where $M_L$ represents a cost function having an interrelationship between the pixel f(i,j) and the left side neighboring pixel f(i,j−1), $M_R(f(i,j))$ represents a cost function having an interrelationship between the pixel f(i,j) and the right side neighboring pixel f(i,j+1), $M_U(f(i,j))$ represents a cost function having an interrelationship between the pixel f(i,j) and the upper side neighboring pixel f(i−1,j), and $M_D(f(i,j))$ is a cost function having an interrelationship between the pixel f(i,j) and the lower side neighboring pixel f(i+1,j).

Next, the cost functions including a smoothing degree and reliability are defined. The regularization parameter variable is included in only the portion (the second term of the right side in Equation 4) of the reliability with respect to the original pixel and recovered pixel. Differently from this construction, in another embodiment of the present invention, the regularization parameter variable is included in the portion which represents a reliability of the original pixel and recovered pixel as well as is included in the portion which represents the smoothing degree with respect to the original pixel and the neighboring pixel. In addition, the smoothing degree and the reliability of the pixel are opposite each other [inn] *in* their meaning. Each cost function may be expressed based on Equation 19[. Equation 19.] *as follows:*

$$M_L(f(i,j))=\alpha_L(f(i,j))[f(i,j)-f(i,j-1)]^2+(1-\alpha_L(f(i,j)))[g(i,j)-f(i,j)]^2$$

$$M_R(f(i,j))=\alpha_R(f(i,j))[f(i,j)-f(i,j+1)]^2+(1-\alpha_R(f(i,j)))[g(i,j)-f(i,j)]^2$$

[$M_U(f(i,j))=\alpha_U(f(i,j))[i\ f(i,j)-f(i-1i,j)]^2+(1-\alpha_U(f(i,j)))[g(i,j)-f(i,j)]^2$]

$M_U(f(i,j))=\alpha_U(f(i,j))[f(i,j)-f(i-1,j)]^2+(1-\alpha_U(f(i,j)))[g(i,j)-f(i,j]^2$ $M_D(f(i,j))=\alpha_D(f(i,j))[f(i,j)-f(i+1,j)]^2+(1-\alpha_D(f(i,j)))[g(i,j)-f(i,j)]^2$ (19)

As seen in Equation 19, the first term of the right side represents a smoothing degree with respect to the original pixel and the neighboring pixel, and the second term of the right side represents a reliability with respect to the original pixel and the recovered pixel. Here, $\alpha_L$, $\alpha_R$, $\alpha_U$, $\alpha_D$ represent a regularization parameter variable with respect to each cost function and represent a ratio of a smoothing degree and reliability as a difference component. For example, $\alpha_L$ represents a weight value with respect to the smoothing degree, and $1-\alpha_L$ represents a weight value with respect to the reliability. Therefore, as the regularization parameter variable is increased, the smoothing degree is increased, and the reliability is decreased. Since the regularization includes the right side first term and the left side term of the cost function, it is possible to implement more stable smoothing [degree] and reliability compared to the earlier embodiment of the present invention.

Next, in order to obtain the recovering pixel, the cost function is partially differentiated with respect to the original pixel. The thusly differentiated value is obtained by the following Equation 20.

$$\partial M\frac{(f(i,j))}{\partial f(i,j)}=\frac{\partial M_L(f(i,j))}{\partial f(i,j)}+\frac{\partial M_g(f(i,j))}{\partial f(i,j)}+\frac{\partial M_g(f(i,j))}{\partial f(i,j)}+\frac{\partial M_U(f(i,j))}{\partial f(i,j)}+\frac{\partial M_D(f(i,j))}{\partial f(i,j)}=0 \tag{20}$$

The terms of the right side of Equation 20 are as follows:

$$\frac{\partial M_L(f(i,j))}{\partial f(i,j)}=2\alpha_L(f(i,j))[f(i,j)-f(i,j-1)]-2(1-\alpha_L(f(i,j)))[g(i,j)-f(i,j)] \tag{21}$$

$$\frac{\partial M_g(f(i,j))}{\partial f(i,j)}=2\alpha_g(f(i,j))[f(i,j)-f(i,j+1)]-2(1-\alpha_g(f(i,j)))[g(i,j)-f(i,j)]$$

$$\frac{\partial M_U(f(i,j))}{\partial f(i,j)}=2\alpha_U(f(i,j))[f(i,j)-f(i-1,j)]-2(1-\alpha_U(f(i,j)))[g(i,j)-f(i,j)]$$

$$\frac{\partial M_D(f(i,j))}{\partial f(i,j)}=2\alpha_D(f(i,j))[f(i,j)-f(i+1,j)]-2(1-\alpha_D(f(i,j)))[g(i,j)-f(i,j)]$$

When the values expressed based on Equation 21 are substituted for Equation 20, the finally recovered pixels are obtained based on the following Equation 22.

$$f(i,j)=\frac{\alpha_L f(i,j-1)+\alpha_g f(i,j+1)+\alpha_U f(i-1,j)+\alpha_D f(i+1,j)+(4-\alpha_{TOT})g(i,j)}{4} \tag{22}$$

$$\alpha_{TOT}=\alpha_L+\alpha_g+\alpha_U+\alpha_D$$

In addition, in the macro type(mtype), the bit value which is defined as COD is included. This COD includes an information of the macro block. If COD value is '0', it means the coded macro block, and if COD value is '1', it means the non-coded macro block (not coded). Namely, it is possible to [Recognize] *recognize* whether the pixels of the current macro block are the same as the pixels of the previously transmitted macro block. If COD value is '0', it means that the macro block of the previous compressed image is different from the macro block of the current image, and if COD value is '1', it means that the macro block of the previous image is the same as the macro block of the current image. Therefore, if COD value is '0', the value is recovered based on Equation 22, and if COD value is '1', as seen in Equation 23, the recovered pixel value fp(i,j) is substituted for the current pixel value with respect to the macro block of the previous image.

$$f(i,j)=fp(i,j) \tag{23}$$

Next, as seen in Equation 22, the recovering pixel includes a regularization parameter variable $\alpha$, and each regularization parameter variable is obtained as follows.

The regularization parameter variable is obtained based on Equation 19. Namely, since the smoothing degree and reliability are opposite to each other, the regularization parameter variable may be arranged *according to Equation 24* as follows based on a ratio of the smoothing degree and the reliability. Equation 24 may be expressed as follows.

$$\frac{i-\alpha_L}{\alpha_L}=\frac{[f(i,j)-f(i,j-1)]^2}{[f(i,j)-g(i,j)]^2} \tag{24}$$

$$\frac{i-\alpha_g}{\alpha_g}=\frac{[f(i,j)-f(i,j+1)]^2}{[f(i,j)-g(i,j)]^2}$$

$$\frac{i-\alpha_U}{\alpha_U}=\frac{[f(i,j)-f(i-1,j)]^2}{[f(i,j)-g(i,j)]^2}$$

$$\frac{i-\alpha_D}{\alpha_D}=\frac{[f(i,j)-f(i+1,j)]^2}{[f(i,j)-g(i,j)]^2}$$

In order to obtain the regularization parameter variable expressed as Equation 24, the pixels f(i,j), f(ij−1), f(i,j+1), f(i−1,j), f(i+1,j) must be approximated based on the compressed pixels g(i,j), g(i,j−1), g(i,j+1), g(i−1,j), g(i+1,j) which may be actually used. For implementing the above-described operation, the following three cases are assumed.

First, a quantization difference of each pixel is a function of a quantization variable Qp which is set by the unit of macro blocks.

Second, since the block artifacts generating at a block boundary has a certain non-uniformity degree which is larger than the ring effect occurring in the interior of the block, the difference with respect to the pixels positioned at the block boundary is more largely reflected compared to the pixels positioned in the interior of the block. Namely, a weight value is provided to the difference based on the position of the pixels.

Equation 24 is approximated to Equation 25 based on the above-described two assumptions.

$$\frac{i-\alpha_L}{\alpha_L}=\frac{[f(i,j)-f(i,j-1)]^2}{[f(i,j)-g(i,j)]^2}=\frac{[g(i,j)-g(i,j-1)]^2}{\Phi(Q_p)} \tag{25}$$

$$\frac{i-\alpha_g}{\alpha_g}=\frac{[f(i,j)-f(i,j+1)]^2}{[f(i,j)-g(i,j)]^2}=\frac{[g(i,j)-g(i,j+1)]^2}{\Phi(Q_p)}$$

$$\frac{i-\alpha_U}{\alpha_U}=\frac{[f(i,j)-f(i-1,j)]^2}{[f(i,j)-g(i,j)]^2}=\frac{[g(i,j)-g(i-1,j)]^2}{\Phi(Q_p)}$$

-continued $$\frac{i-\alpha_D}{\alpha_D}=\frac{[f(i,j)-f(i+1,j)]^2}{[f(i,j)-g(i,j)]^2}=\frac{[g(i,j)-g(i+1,j)]^2}{\Phi(Q_p)}$$

where $\Phi(Qp)$ is a function of the quantizating variable Qp and is different based on the position of *a* pixel.

Therefore, with consideration of the position of each pixel in the function $\Phi(Qp)$, $\Phi(Qp)$ may be expressed as $K_LQP^2$ with respect to $\alpha_L$, and $\Phi(Qp)$ is expressed as $K_RQp^2$ with respect to $\alpha_R$, and $\Phi(Qp)$ is expressed as $K_UQp^2$, with respect to $\alpha_U$, and $\Phi(Qp)$ is expressed as $K_DQp^2$ with respect to $\alpha_D$. Here, constants $K_L$, $K_R$, $K_U$, $K_D$ are weight values and are different based on whether the neighboring pixel is positioned at the block boundary or in the interior of the block. With consideration to the position of each pixel, type regularization parameter variable is approximated based on the following Equation 26.

$$\alpha_L=\frac{K_LQ_p^2}{[g(i,j)-g(i,j-1)]^2+K_LQ_p^2} \tag{26}$$

$$\alpha_g=\frac{K_gQ_p^2}{[g(i,j)-g(i,j+1)]^2+K_gQ_p^2}$$

$$\alpha_U=\frac{K_UQ_p^2}{[g(i,j)-g(i-1,j)]^2+K_UQ_p^2}$$

$$\alpha_D=\frac{K_DQ_p^2}{[g(i,j)-g(i+1,j)]^2+K_DQ_p^2}$$

Assuming that one block is formed of 8×8 number of pixels, namely, assuming that I and j of f(i,j) is 8, respectively, the weight values $K_L$, $K_R$, $K_U$, $K_D$ may be expressed as follows.

$K_L$={9, if j mod 8=0; 1, otherwise}

$K_R$={9, if j mod 8=7; 1, otherwise}

$K_U$={9, if i mod 8=0; 1, otherwise}

$K_D$={9, if i mod 8=7; 1, otherwise}

For example, in the Equation related to $K_L$, if the residual is 0 when dividing j by 8, $K_L$ is 9, and otherwise, $K_L$ is 1.

When the approximated regularization parameter values are substituted for Equation 22, it is possible to obtain a resultant value f(i,j).

Figure 5:
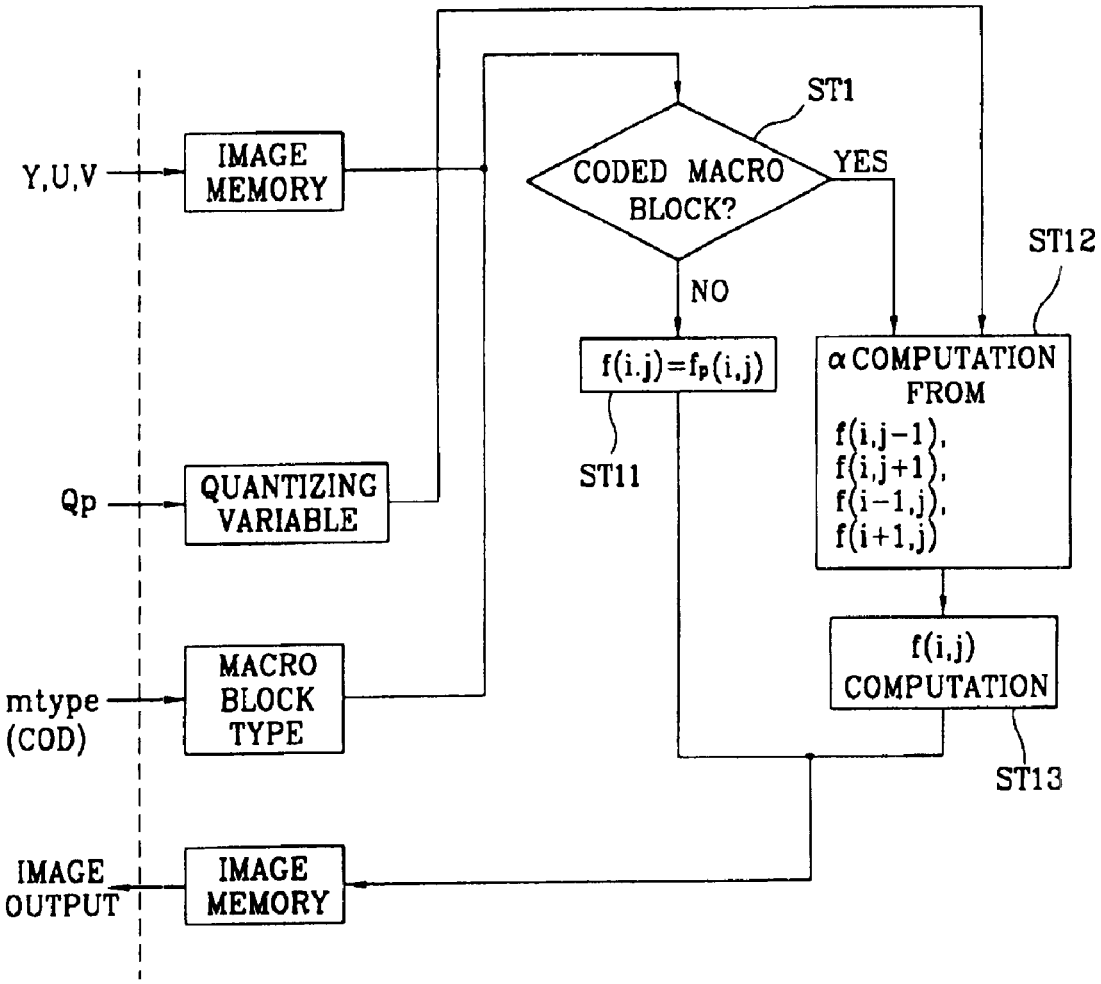
FIG. 5 is a flow chart of a method for recovering a compressed motion picture according to another embodiment of the present invention.

FIG. 5 is a flow chart illustrating a method for recovering a compressed image for an image processing system according to another embodiment of the present invention.

In Step ST10, it is judged whether the pixels of the current macro block are the same as the pixels of the previously transmitted macro block based on the COD value. If they are same, in Step ST11, the recovering pixel values are substituted for the pixel values which are previously recovered based on Equation 23. If they are not *the* same, in Step ST12, the regularization parameter variables $\alpha_L$, $\alpha_R$, $\alpha_U$, $\alpha_D$ are obtained based on Equation 26, and the recovering pixel f(i,j) is obtained based on Equation 22 in Step ST13.

As described above, in the present invention, a certain weight is provided to the regularization parameter variable, which will be approximated, based on the position of the pixels in consideration with the reliability and smoothing degree as well as the regularization parameter variables, so that it is possible to obtain a value which is near the actual pixel value. Therefore, in the present invention, it is not needed to perform a projection method and a repetition method. In addition, in the present invention, the computation amount and time are significantly decreased.

The invention being thus described, it will be obvious that the same may be varied in many ways. Such variations are not to be regarded as a departure from the spirit and scope of the invention, and all such modifications as would be obvious to one skilled in the art are intended to be included within the scope of the [following claims] *invention*.

What is claimed is:

1. A method for recovering a compressed motion picture, comprising the steps of:

defining a cost function having a smoothing degree of an image and a reliability with respect to an original image in consideration of the directional characteristics of the pixels which will be recovered and a plurality of pixels near the pixels which will be recovered;

obtaining a regularization parameter variable having a weight value of the reliability with respect to the original image based on a cost function; and approximating the regularization parameter variable using the compressed pixel and obtaining a pixel which will be recovered, wherein said regularization parameter variable is a weight value with respect to reliability and is determined based on a difference between the original pixel and the compressed pixel and a difference value between the original pixel and the neighboring pixel.

2. The method of claim 1, wherein said cost function includes another cost function for setting an interrelationship of a time region with respect to the recovering pixel when the pixel which will be recovered is in an inter macro block.

3. The method of claim 1, wherein said cost function includes another cost function which is defined based on a smoothing degree which is obtained by computing a difference between the recovering pixel and the neighboring pixel, a reliability of the original image obtained by computing a difference between the original image and the compressed image, and an interrelationship of a time region of the pixels of the block having a motion information.

4. The method of claim 1, wherein said plurality of neighboring pixels are the pixels which are neighboring in the upper, lower, left and right side directions of the recovering pixels.

5. The method of claim 1, wherein said difference value between the original pixel and the compressed pixel is approximated based on a quantizing maximum difference, and a difference value between the original pixel and the neighboring pixel is approximated based on a difference value between the compressed pixel and the neighboring compressed pixel.

6. The method of claim 1, after the step for obtaining the recovering pixel, further comprising a step for performing a DCT with respect to the recovering pixels, projecting the recovering pixels in accordance with pixel value which will be processed, and performing a reverse DCT with respect to the projected images, and in said projecting step, a recovering image is projected at a subset for setting a range of DCT coefficients of a compressed image, and a maximum quantizing difference of the macro block is included in the subset.

7. The method of claim 1, wherein in said step for approximating the regularization parameter variable, a quantizing maximum difference of a macro block unit is a quantizing variable, a quantizing difference is uniformly allocated to each pixel in a corresponding macro block, and the non-uniform values between two pixels of the original image are statistically similar to the non-uniform values between the two pixels of the compressed image.

8. The method of claim 1, wherein said regularization parameter variable includes a weight value of a smoothing degree of the original image based on the cost function.

9. The method of claim 8, wherein when the pixels of the current macro block are the same as the pixels of the previously transmitted macro block, the recovered pixel values are substituted for the current pixel values [with respect to the macro block of the previous image] *of the previously transmitted macro block.*

10. The method of claim 8, wherein in said step for approximating the regularization parameter variable, a quantizing difference of each pixel is set based on a function of a quantizing variable set by the unit of a macro block, and a weight value is added to the pixel based on the pixel position.

11. In a method for recovering a compressed motion image for processing an original pixel f(i,j) based on a DCT by the unit of macro blocks of a M×M size, quantizing the DCT-processed coefficient, transmitting together with motion vector information, reversely quantizing and reversely DCT-processing the compressed pixel g(i,j) and recovering an image similar to the original image, a method for recovering a compressed motion picture, comprising the steps of:

defining a cost function M(i,j) having a smoothing degree of an image and a reliability with respect to an original image as a pixel unit in consideration of a directional characteristic between the pixels which will be recovered and the pixels neighboring the pixels which will be recovered;

adaptively searching a regularization parameter variable having a weight of a reliability with respect to the original image from the cost function M(i,j); and obtaining a projected pixel P(F(u,v)) using a projection method for mapping the pixels which will be recovered in accordance with a range value of the pixels which will be recovered, wherein said regularization parameter variable is a weight value with respect to reliability and is determined based on a difference between the original pixel and the compressed pixel and a difference value between the original pixel and the neighboring pixel.

12. The method of claim 11, wherein said cost function M(i,j) is formed of a cost function $M_{HL}(f(i,j))$ which represents a smoothing degree and a reliability with respect to an original pixel f(i,j) and a left side neighboring pixel f(i,j−1), a cost function $M_{HR}(f(i,j))$ which represents a smoothing degree and a reliability with respect to the original pixel f(ij)and a right side neighboring pixel f(i,j+1), a cost function $M_{VT}(f(i,j))$ which represents a smoothing degree and a reliability with reflect to the original pixel f(i,j) and an upper side neighboring pixel f(i−1,j), a cost function $M_{VD}f(i,j))$ which represents a smoothing degree and a reliability with respect to the original pixel f(i,j) and a lower side neighboring pixel f(i+1,j), and a cost function $M_T(f(i,j))$ for setting an interrelationship of a time region with respect to the original pixel.

13. The method of claim 12, wherein each cost function is obtained according to the following equations:

$$M_{HL}(f(i,j))=[f(i,j)-f(i,j-1)]^2+\alpha_{HL}[g(i,j)-f(i,j)]^2$$

$$[M_{HR}(f(i,j))=[f(i,j)-f(i,j-1)]^2+\alpha_{HR}[g(i,j)-f(i,j)]^2]\ M_{HR}(f(i,j))=[f(i,j)-f(i,j+1)]^2+\alpha_{HR}[g(i,j)-f(i,j)]^2$$

$$[M_{VT}(f(i,j))=[f(i,j)-f(i,j-1)]^2+\alpha_{VT}[g(i,j)-f(i,j)]^2]\ M_{VT}(f(i,j))=[f(i,j)-f(i-1,j)]^2+\alpha_{VT}[g(i,j)-f(i,j)]^2$$

$$[M_{VD}(f(i,j))=[f(i,j)-f(i,j+1)]^2+\alpha_{VD}[g(i,j)-f(i,j)]^2]\ M_{VD}(f(i,j))=[f(i,j)-f(i+1,j)]^2+\alpha_{VD}[g(i,j)-f(i,j)]^2$$

$$M_T(f(i,j))=[f(i,j)-f_{MC}(i,j)]^2+\alpha_T[g(i,j)-f(i,j)]^2$$

where $f_{MC}$ (i,j) represents a motion compensated pixel, $\alpha_{HL}$, $\alpha_{HR}$, $\alpha_{VT}$, $\alpha_{VD}$ and $\alpha_T$ represent a regulation parameter variable with respect to each cost function.

14. The method of claim 13, wherein the pixel f(i,j) which will be recovered is obtained based on the following equation when the pixel is included in an inter macro block, $$f(i,j)=\frac{f(i,j-1)+f(i,j+1)+f(i-1,j)+f(i+1,j)+f_{MC}(i,j)+\alpha_{TOT}g(i,j)}{5+\alpha_{TOT}}$$

where, $\alpha_{TOT}=\alpha_{HL}+\alpha_{HR}+\alpha_{VT}+\alpha_{VD}+\alpha_T$, and the pixel f(i,j) which will be recovered is obtained based on the following equation when the pixel is included in an intra macro block, $$f(i,j)=\frac{f(i,j-1)+f(i,j+1)+f(i-1,j)+f(i+1,j)+\alpha_{TOT}g(i,j)}{4+\alpha_{TOT}}$$

where $\alpha_{TOT}=\alpha_{HL}+\alpha_{HR}+\alpha_{VT}+\alpha_{VD}$.

15. The method of claim 13, wherein said regularization parameter variables $\alpha_{HL}$, $\alpha_{HR}$, $\alpha_{VT}$, $\alpha_{VD}$, $\alpha_T$ are obtained by approximations as follows:

$$\alpha_{HL}=\frac{[g(i,j)-g(i,j-1)]^2}{Q_{pi}^2},\ \alpha_{HR}=\frac{[g(i,j)-g(i,j+1)]^2}{Q_{pi}^2}$$

$$\alpha_{VT}=\frac{[g(i,j)-g(i-1,j)]^2}{Q_{pi}^2},\ \alpha_{VD}=\frac{[g(i,j)-g(i+1,j)]^2}{Q_{pi}^2}$$

$$\alpha_T=\frac{[g(i,j)-f_{MC}(i,j)]^2}{Q_{pi}^2}$$

where $Q_{p1}$ represents a quantizing variable of the 1-th macro block.

16. The method of claim 11, wherein in said step for obtaining the projected pixel P(F(u,v)), when (u,v)-th value F(u,v) of two-dimensional DCT coefficient of the original image is smaller than G(u,v)−Qp1, the projected pixel P(F(u,v)) is mapped to G(u,v)−Qp1, and when the value F(u,v) is larger than G(u, v)+Qp1, the projected pixel P(F(u, v)) is mapped to G(u, v)+Qp1, otherwise, the projected pixel P(F(u,v) is mapped to F(u, v), where G(u, v) represents (u,v)th value of the two-dimensional DCT coefficient of the compression image, and Qp1 represents a quantizing maximum difference of the 1-th macro block.

17. The method of claim 11, further comprising the following steps which are repeatedly performed by k-times:

defining a cost function M(i,j) having a smoothing degree of an image and a reliability with respect to the original image by the unit of pixels in consideration with a directional characteristic between the pixels which will be removed and the pixels neighboring the pixels which will be recovered;

adaptively searching a regularization parameter variable having a weight value of a reliability with respect to the original image from the cost function M(i,j); and obtaining a projected pixel P(F(u,v) using a projection method for mapping the recovering pixel in accordance with a range value of the pixel which will be recovered, for thereby finally obtaining a recovering image.

18. In a method for recovering a compressed motion image for processing an original pixel f(i,j) based on a DCT by the unit of macro blocks of a M×M size, quantizing the DCT-processed coefficient, transmitting together with motion vector information, reversely quantizing and reversely DCT-processing the compressed pixel g(i,j) and recovering an image similar to the original image, a method for recovering a compressed motion picture, comprising the steps of:

defining a cost function M(i,j) having a smoothing degree of an image and a reliability with respect to an original image as a pixel unit in consideration of a directional characteristic between the pixels which will be recovered and the pixels neighboring the pixels which will be recovered;

adaptively searching a regularization parameter variable having a weight of a reliability with respect to the original image from the cost function M(i,j); and obtaining a finally recovered image of a spatial region by obtaining a block DCT coefficient based on a block DCT and obtaining a projected pixel P(F(u,v)) by a projection method for mapping the pixels which will be recovered in a range value of the pixel for processing the block DCT coefficient, and performing a reverse DCT, wherein said regularization parameter variable is a weight value with respect to reliability and is determined based on a difference between the original pixel and the compressed pixel and a difference value between the original pixel and the neighboring pixel.

19. An apparatus for recovering a compressed motion picture, comprising:

an image decoding unit for outputting an information with respect to an image which will be recovered such as a decoded image, a quantized variable, a macro block type, and a motion type by decoding a coded image signal; and a block process eliminating filter for defining a cost function based on a smoothing degree of an image and a reliability with respect to an original pixel in consideration of a directional characteristic between the neighboring pixel and the pixel which will be processed based on the pixels which will be recovered using an information with respect to the image which will be recovered inputted from the image decoding unit, adaptively searching a regularization parameter variable which provides a weight of a reliability with respect to the original image for each cost function, and recovering an original pixel using a projection method for mapping the pixels which will be recovered in accordance with a range value of the pixels which will be processed, wherein said regularization parameter variable is a weight value with respect to reliability and is determined based on a difference between the original pixel and the compressed pixel and a difference value between the original pixel and the neighboring pixel.

20. The apparatus of claim 19, further comprising:

a DCT unit for performing a DCT with respect to an image recovered by the block process eliminating filter;

a vector projection unit for projecting a pixel which will be recovered in accordance with a pixel value after the DCT process is performed; and an IDCT unit for performing a reverse DCT with respect to the image projected by the vector projection unit.

21. In a method for recovering a compressed motion image for processing an original pixel f(i,j) based on a DCT by the unit of macro blocks of a M×M size, quantizing the DCT-processed coefficient, transmitting together with motion vector information, reversely quantizing and reversely DCT-processing the compressed pixel g(i,j) and recovering an image similar to the original image, a method for recovering a compressed motion picture, comprising the steps of:

defining a cost function M(i,j) having a smoothing degree of an image and a reliability with respect to an original image as a pixel unit in consideration with a directional characteristic between the pixels which will be recovered and the pixels neighboring the pixels which will be recovered; and adaptively searching a regularization parameter variable having a weight of a reliability with respect to the original image from the cost function M(i,j) and a weight value of a smoothing degree of the original image, wherein said regularization parameter variable is a weight value with respect to reliability and is determined based on a difference between the original pixel and the compressed pixel and a difference value between the original pixel and the neighboring pixel.

22. The method of claim 21, wherein said cost function is obtained based on the following equations:

$$M_L(f(i,j))=\alpha_L(f(i,j))[f(i,j)-f(i,j-1)]^2+(1-\alpha_L(f(i,j)))[g(i,j)-f(i,j)]^2$$

$$M_R(f(i,j))=\alpha_R(f(i,j))[f(i,j)-f(i,j+1)]^2+(1-\alpha_R(f(i,j)))[g(i,j)-f(i,j)]^2$$

$$M_U(f(i,j))=\alpha_U(f(i,j))[f(i,j)-f(i-1,j)]^2+(1-\alpha_U(f(i,j)))[g(i,j)-f(i,j)]^2$$

$$[M_D(f(i,j))=\alpha_D(f(i,j))[f(i,j)-f(i-1,j)]^2+(1-\alpha_D(f(i,j)))[g(i,j)-f(i,j)]^2]$$

$$M_D(f(i,j))=\alpha_D(f(i,j))[f(i,j)-f(i+1,j)]^2+(1-\alpha_D(f(i,j)))[g(i,j)-f(i,j)]^2$$

where $\alpha_L$, $\alpha_R$, $\alpha_U$, $\alpha_D$ are regularization parameter variables with respect to each cost function.

23. The method of claim 22, wherein when the pixel of the current macro block is the same as the pixel of the previously transmitted macro block, in said pixel f(i,j) which will be recovered, the pixel value which is previously recovered with respect to the macro block of the previous image is substituted for the current pixel value, and otherwise the following Equation is obtained:

$$f(i,j)=\frac{\alpha_L f(i,j-1)+\alpha_g f(i,j+1)+\alpha_U f(i-1,j)+\alpha_D f(i+1,j)+(4-\alpha_{TOT})g(i,j)}{4}$$

where $\alpha_{TOT}=\alpha_L+\alpha_R+\alpha_U+\alpha_D$.

24. The method of claim 22, wherein said regularization parameter variables $\alpha_L$, $\alpha_R$, $\alpha_U$, $\alpha_D$ are approximated as follows:

$$\alpha_L=\frac{K_L Q_p^2}{[g(i,j)-g(i,j-1)]^2+K_L Q_p^2}$$

$$\alpha_g=\frac{K_g Q_p^2}{[g(i,j)-g(i,j+1)]^2+K_g Q_p^2}$$

$$\alpha_U=\frac{K_U Q_p^2}{[g(i,j)-g(i-1,j)]^2+K_U Q_p^2}$$

$$\alpha_D=\frac{K_D Q_p^2}{[g(i,j)-g(i+1,j)]^2+K_D Q_p^2}$$

where $K_L Qp^2$, $K_R Qp^2$, $K_U Qp^2$, $K_D Qp^2$ are functions of the quantizing variable Qp, and constants $K_L$, $K_R$, $K_U$, $K_D$ are weight values with respect to the regularization parameter variables $\alpha_L$, $\alpha_R$, $\alpha_U$, $\alpha_D$, and have different values based on whether the neighboring pixel is positioned at the block boundary or in the interior of the block.

25. The method of claim 24, wherein the weight values $K_L$, $K_R$, $K_U$, $K_D$ are expressed as follows, assuming that i and j of the pixel f(i,j) are 8, respectively, $K_L$={9, if j mod 8=0; 1, otherwise}

$K_R$={9, if j mod 8=7; 1, otherwise}

$K_U$={9, if i mod 8=0; 1, otherwise}

$K_D$={9, if i mod 8=7; 1, otherwise}.

26. An apparatus for recovering a compressed motion picture, comprising:

an image decoding unit for outputting an information with respect to an image which will be recovered, a quantized variable, a macro block type, and a motion type by decoding a coded image signal; and a block process eliminating filter for defining a cost function based on a smoothing degree of an image and a reliability with respect to an original pixel in consideration of a directional characteristic between a neighboring pixel and the pixel which will be processed based on the pixels which will be recovered using an information with respect to the image which will be recovered inputted from the image decoding unit, and adaptively searching a regularization parameter variable which has a weight of a reliability with respect to the original image from each cost function and a weight of a smoothing degree of the original image for thereby recovering an original pixel, wherein said regularization parameter variable is a weight value with respect to reliability and is determined based on a difference between the original pixel and the compressed pixel and a difference value between the original pixel and the neighboring pixel.

* * * * *